(12) United States Patent
Nielsen

(10) Patent No.: US 9,065,672 B2
(45) Date of Patent: Jun. 23, 2015

(54) WIRELESS COMMUNICATION FOR AUTOMATION

(75) Inventor: Martin Sandal Nielsen, Norre Nebel (DK)

(73) Assignee: VKR HOLDING A/S (DK)

( * ) Notice: Subject to any disclaimer, the term of this patent is extended or adjusted under 35 U.S.C. 154(b) by 763 days.

(21) Appl. No.: 12/563,271

(22) Filed: Sep. 21, 2009

(65) Prior Publication Data

US 2010/0257295 A1 Oct. 7, 2010

(30) Foreign Application Priority Data

Apr. 3, 2009 (EP) ..................................... 09157254

(51) Int. Cl.
*H04L 12/28* (2006.01)
*H04L 1/16* (2006.01)
*H04L 29/12* (2006.01)
*H04L 12/24* (2006.01)
*H04W 12/06* (2009.01)
*H04L 29/06* (2006.01)

(52) U.S. Cl.
CPC ........ *H04L 12/2838* (2013.01); *H04L 12/2803* (2013.01); *H04L 1/1621* (2013.01); *H04L 12/2821* (2013.01); *H04L 29/12292* (2013.01); *H04L 41/0893* (2013.01); *H04L 61/2069* (2013.01); *H04L 63/08* (2013.01); *H04L 63/10* (2013.01); *H04L 63/101* (2013.01); *H04L 63/104* (2013.01); *H04L 63/1408* (2013.01); *H04L 63/162* (2013.01); *H04L 2012/2841* (2013.01); *H04W 12/06* (2013.01)

(58) Field of Classification Search
CPC .............. H04L 12/282; H04L 12/2803; H04L 12/2821; H04L 12/2838; H04L 2012/2803; H04L 2012/2841; H04L 1/1621

USPC ............. 340/10.52, 3.2, 3.21, 3.3, 3.31, 3.32, 340/3.41, 3.7, 3.71, 4.21, 7.46, 7.47, 340/9.1–9.17, 3.5, 3.52, 3.53, 3.54; 710/9, 710/110
See application file for complete search history.

(56) References Cited

U.S. PATENT DOCUMENTS

| | | |
|---|---|---|
| 6,064,297 A | 5/2000 | Odinak et al. |
| 2003/0102979 A1* | 6/2003 | Jednacz et al. ........... 340/825.52 |
| 2004/0080427 A1* | 4/2004 | Odinak et al. ........... 340/825.52 |
| 2005/0024228 A1* | 2/2005 | Vignon et al. ........... 340/825.72 |
| 2005/0266826 A1 | 12/2005 | Vlad |
| 2006/0004939 A1 | 1/2006 | Edwards et al. |
| 2006/0061482 A1* | 3/2006 | Monney et al. .......... 340/825.52 |
| 2006/0087407 A1* | 4/2006 | Stewart et al. ............ 340/10.52 |
| 2006/0156388 A1 | 7/2006 | Stirbu et al. |
| 2006/0165072 A1* | 7/2006 | Vacherand et al. ........... 370/389 |

(Continued)

OTHER PUBLICATIONS

European Search Report EP 09 15 7254; Dated May 13, 2009.
Carl Ellison, "DeviceSecurity:1 Service Template for UPNP Device Architecture 1.0" {Online} Nov. 17, 2003, XP008095418.

(Continued)

*Primary Examiner* — Daniell L Negron
*Assistant Examiner* — Benyam Haile
(74) *Attorney, Agent, or Firm* — Cantor Colburn LLP

(57) ABSTRACT

A method of communicating to a group of slaves is provided and includes storing in a slave at least one group identifier and at least one originator identifier, communicating an instruction, a group identifier and an originator identifier to the slaves, accepting the communicated instruction by the slaves, when the group identifier and the originator identifier in the communication match the group identifier and the originator identifier stored in the slave.

35 Claims, 6 Drawing Sheets

(56) References Cited

U.S. PATENT DOCUMENTS

2007/0115975 A1   5/2007  Zhang
2007/0198671 A1*  8/2007  Motoyama .................... 709/222

OTHER PUBLICATIONS

Heung Youl Youm, et al Soonchunhyang Univ. Korea, et al. "Proposal of future study items for developing the security standard of the home network" Mar. 30, 2005 vol. Study Group 17, pp. 1-5.

* cited by examiner

WIRELESS COMMUNICATION FOR AUTOMATION

FIELD OF THE INVENTION

Aspects of the present invention relate generally to wireless automation.

BACKGROUND

Communication in buildings and personal area systems may be used in the monitoring or control of automation of, for example, energy management, sensors, monitoring, detectors, healthcare, security, access control, operators, actuators, locks, lighting, metering, climate systems, windows, shades, heating, entertainment, information devices and appliances (hereafter called automation). Communication may take place between a controller and a controllable device, between nodes, between a master and a slave or between a transmitter and a receiver. Control of automation may involve such communication among individuals or groups.

In relation to wireless communication and automation there is a need for secure communication of data and/or instructions. For example, EP1340198B1 provides a secure communication between a controller and a controllable device, by producing a challenge request which the controller from which the communication originates is able to authenticate by sending a MAC (Message Authentication Code). Such a challenge request and message authentication method ensures that no communication from foreign controllers or communication that has been tampered will be accepted by the receiver.

Synchronous communication may also be provided to a group, so the group can perform synchronized actions. In other cases, automation power consumption may be reduced by communication to a group. In still other cases, bandwidth occupation may be reduced by way of group communication. Some automation communications may have a drawback, however, which arises during communications with a group of nodes where all of the nodes in a group cannot communicate at the same time due to collisions between the communications. Consequently, a sequential communication system may be used to communicate with one node after another node. This system causes an unfortunate delay for some nodes. Further because automation communication often has low power consumption, the data bit rate is also low and this may increase the delay.

The sequential activation may, therefore, have an unfortunate effect, when for example 20 slaves (light sources) are dimmed where each dim is more or less delayed. Another example may be, when 5 electric window shades start to move to block the sun and each shade has a slight delay. Another example may be an automation status change, like a change in mode or scenario which is communicated to a group. Group communication may advantageously be synchronous or provide reduced power consumption.

It would be advantageous to provide communication for automation that eliminate or reduce the drawbacks mentioned above and further provide a number of advantages, for example reduced power consumption, because some products or controllers may be battery powered or powered by a limited or renewable energy source. Consequently it may be advantageous to limit the communication and data load, while still providing secure and reliable communication.

SUMMARY OF THE INVENTION

In accordance with an aspect of the invention, a method of communicating to a group of slaves is provided and includes storing in a slave at least one group identifier and at least one originator identifier, communicating an instruction, a group identifier and an originator identifier to the slaves, accepting the communicated instruction by the slaves, when the group identifier and the originator identifier in the communication match the group identifier and the originator identifier stored in the slave.

In accordance with another aspect of the invention, a controllable wireless communication device, including a wireless communication component, a processor and an input/output unit, is provided, the device being configured to receive a wireless group communication characterized in that the device is configured to store at least one group identifier and at least one originator identifier, the device is configured to receive a wireless communication comprising an instruction and a group identifier and an originator identifier and, the device is configured to accept the communicated instruction, when the group identifier and originator identifier in the communication match the group identifier and the originator identifier stored in the device.

In accordance with another aspect of the invention, a wireless communication master device including a wireless communication component, a processor and an input/output unit, is provided, the device being configured to transmit a wireless group communication characterized in that the device has a device identifier and is configured to store at least one group identifier, and the device is configured to transmit a wireless group communication comprising an instruction, the group identifier and the device identifier.

Other features and advantages of the disclosed embodiments will appear from the following detailed disclosure, from the attached dependent claims as well as from the drawings. Generally, all terms used in the claims are to be interpreted according to their ordinary meaning in the technical field, unless explicitly defined otherwise herein. Steps do need not be performed in the disclosed sequence, unless explicitly defined. All references to "a/an/the [element, device, component, means, step, etc]" are to be interpreted openly as referring to at least one instance of the element, device, component, means, step, etc., unless explicitly stated otherwise.

BRIEF DESCRIPTION OF THE DRAWINGS

The foregoing and other aspects of the teachings of this invention are made more evident in the following description, when read in conjunction with the attached figures, wherein.

DETAILED DESCRIPTION

The disclosed embodiments will now be described more fully hereinafter with reference to the accompanying drawings, in which certain examples are shown. These disclosed examples may, however, be embodied in many different forms and should not be construed as limited; rather, these examples are provided by way of example so that this disclosure will be thorough and complete, and will fully convey the scope of the disclosed embodiments to those skilled in the art. Like numbers refer to like elements throughout.

Figure 1:
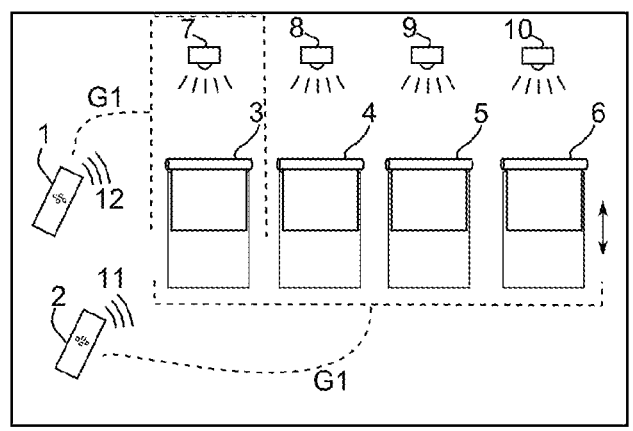
FIG. 1 shows an example of device groups and controllers.

FIG. 1 illustrates 2 masters, e.g. remotes (1-2) and 8 slaves e.g. window shades (3-6) and lighting (7-10). For example, slaves (3-6) are arranged into a group (G1) by a master (2) and the slaves (3-6) store information that associates the slaves (3-6) to master (2) group G1. Further slaves (3,7) are arranged into a group (G1) by a master (1) such that the slaves (3,7) store information associating the slaves (3,7) to master (1) group (G1).

When a group communication (11) is executed by a master (2), the communication includes information about group (G1) and information about the master (2) and all the listening slaves (3-10) determine if they have information about master (2) group (G1). If that is the case, the slaves e.g slaves (3-6) in this example accept the group communication. Similarly, master (1) may also perform a group communication (12) including information about master (1), group (G1) and slaves (3,7), which have information associating them to master (1) group (G1). The slaves (8-10) will be able to scan such communications (11,12) and quickly determine they are irrelevant and return to sleep, thus conserving more power.

Figure 2:
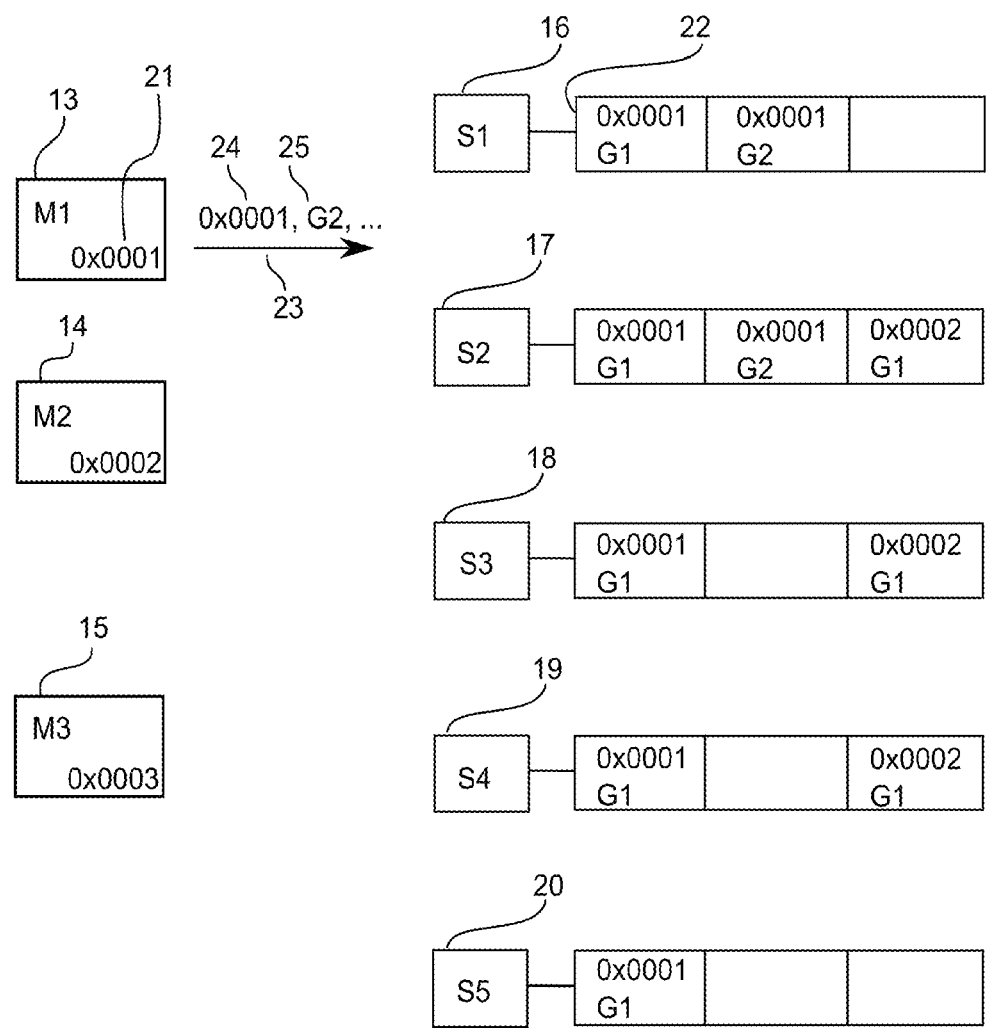
FIG. 2 shows a detailed example of group communication.

FIG. 2 shows a detailed example of group communication by example of masters (13-15) and slaves (16-20). A master (13) has identifier (21) and slaves (16-20) each comprise a table (22) where information about masters and groups may be stored. For example, according to table (22) the slave (16) belongs to master (13) group G1 and G2, because the identifier (21) e.g. 0x0001 associated with group G1 and G2 is stored in the table (22). Consequently from the tables is can be seen, that master (13) has a group G1 comprising slaves (16-20) and a group G2 comprising slaves (16-17). Similarly, the master (14) has a group G1 comprising slaves (17-19). When a group communication (23) from master (13) is performed, the group communication (23) includes an originator identifier (24) and a group identifier (25), which in this example is 0x0001 and G2. The slaves react to the group communication (23) if the originator identifier (24) and group identifier (25) match, which in this example occurs with respect to slaves (16-17).

The originator identifier (24) identifies the communication master/transmitter from where the instruction (23) originates. The originator identifier (24) may be a unique address of the master, a serial number and/or a system assigned address. The originator identifier (24) may be combined from plural sources or may be unique in the system, while the group identifier (25) can be repetitive within the group so that several slaves may store the same group identifier. In one example, the slaves comprise a unique address and the group communication is addressed by the group identifier and the originator identifier and individual communication is addressed using the unique slave address. This provides multiple communication types with multiple security levels and enhances the flexibility of the automation system.

The group identifier (25) identifies the group of slaves. The group identifier (25) may, for example, be a bit, a number, a group code or a group name etc. The group identifier (25) combined with the originator identifier (24) identifies the group of slaves that is associated with a master/transmitter. The group identifier (25) is stored at least in the slaves and may be editable so that slave groups can be configured and later reconfigured or deleted. Before storing the group identifier (25) and originator identifier (24) in the slaves, the memory of the slaves may be tested to ensure there is enough available memory therein.

Association, like storing in a slave at least one originator identifier (24) and possibly at least one group identifier (25), is explained by the following examples. Association may be provided by at least a normal operation mode and an association mode. Association may be provided by pairing, by initiation of a button on both master and slave within specified time. Association may involve performing some action before the nodes enter association mode. These actions may involve pressing a button (or a combination/sequence of buttons) or removal and reinsertion of a battery. In one example, association may be performed by a user configuration like a manual input, entering of a code or a system key into one or both of the nodes. In another example, association is performed when a slave is set to association mode and a master is activated and broadcasts its identifier, whereby the slave stores the identifier from the master as an originator identifier (24).

A second master (15) may also be used to associate or enable association of a first master (13) and a group of slaves (16-20). The second master (15) may already be associated with the group of slaves (16-20). The association may be done by providing the group of slaves (16-20) identifiers related to the first master (13). A communication from the second master (15) may enable association mode between a first slave (13) and a group slaves (16-20).

Association may be performed by the setting of a node in discovery mode, with the node broadcasting association data, by the communication of a secured configuration to the slaves, where the secured configuration may be provided by sharing a code or system key between the master and slave and thereby providing configuration communication security/authenticity, or association may also be performed by near field communication. Here, nodes must be closer to each other or approach each other to be associated. Near field communication may also use button, action, manual code, etc. as explained herein.

Figure 3:
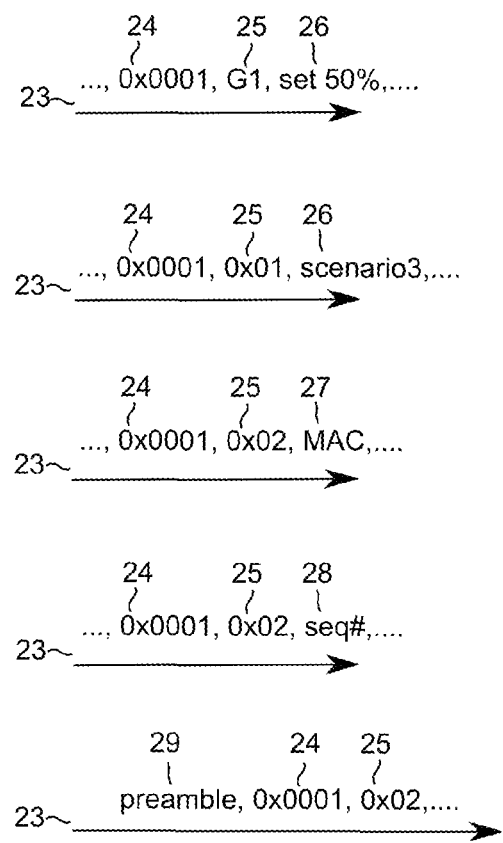
FIG. 3 shows examples of data in group communication.

FIG. 3 shows examples of data in group communication. Group communication (23) may comprise an originator identifier (24) and group identifier (25) and an instruction (26). An instruction (26) may be a command or measured data etc., may indicate a value of a function for example on a scale between 0-100%, may be a system mode change like enter standby or a scenario like entertainment, party, sleep etc., may be a parameter that is relevant for the function of the slaves, like temperature 22 degrees or current electricity price etc., or may provide information about presence of a device/event etc.

A group communication may embed a security parameter providing communication authenticity. A security parameter may, for example, be an encryption or an attachment of a code, or a message authentication code (MAC) (27), which can be authenticated by the master and slaves in question only, for example, because the MAC is based on a shared algorithm or code. The MAC can, for example, be generated based on the address of the transmitter/originator and a code or algorithm. This ensures that the communication with MAC originates from the correct transmitter.

The security parameter may provide authenticity by a rolling code. That is, the group communication (23) may include a sequence identifier (28) indicative of the rolling code used in current group communication. The security parameter may be a sequence identifier (28) indicative of a sequence in a rolling code. The sequence identifier (28) indicative of a sequence in a rolling code may be set during association mode. The association mode may include communication of a security setting associated to a security parameter. For example, a security setting indicative of the rolling code sequence to be used may be employed as the sequence identifier (28). When the nodes are associated they may increment the rolling code after each communication.

The association mode may include communicating to a slave a security setting associated to a security parameter, like a system key or encryption key. When the nodes are associated they may encrypt the communication or use the key to generate a message authentication code.

Figure 4:
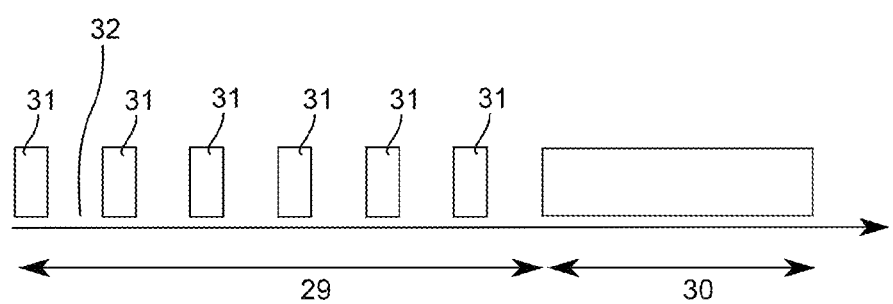
FIG. 4 shows examples of group communication frames.
Figure 4:
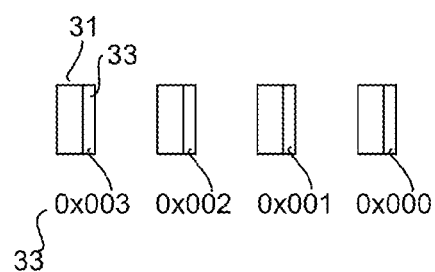

Group communication (23) may include a preamble (29) and a payload including the data, like the group identifier (25) and the originator identifier (24). FIG. 4 shows an example of group communication frames, including a preamble (29) and payload (30). The preamble (29) may include a sequence of frames (31) separated by inactivity (32). The preamble frames (31) may include a series identifier (33), indicative of when the payload is scheduled, and which may be a number decremented in each frame (31) to enable the receiver to determine when the preamble ends based on one frame only. The preamble (29) may be used for both individual communication and group communication.

The preamble (29) provides a number of advantages. The power consumption is lower. The collision risk is reduced, because the preamble may be longer than a constant preamble and may reserve the communication link if a scanning operation before a transmitting operation is used. If the series identifier is used, the receiver may enter power saving mode after one successfully received preamble frame (31) and wake up for the scheduled payload or scheduled group communication.

Figure 5:
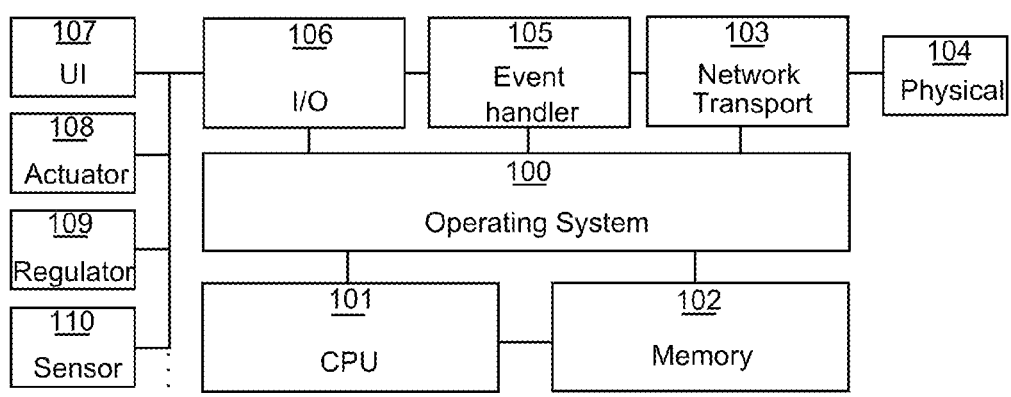
FIG. 5 shows an example of an automation node.

FIG. 5 shows an example of an automation node, which may, for example, be a master or a slave. The node has a processor, such as a central processing unit CPU (101), memory/storage (102) to store and execute the software, settings, parameters etc. An Operating System (OS) (100), which may be a real time OS and/or an embedded OS provides the basic services and may provide power management. The node may also include various modules, protocol stacks, drivers etc. An event handler (105) or function handler and various related applications providing logic automation control may be provided. The node provides communication by a network unit (103) typically incorporating a communication stack. The network unit (103) may operate through a carrier, e.g. a physical link (104) provided by a wireless transmitter, receiver, transceiver, wired network or bus. The device comprises Input/Output (106) means which may facilitate interaction with automation devices, for example an actuator (108), a drive or a regulator (109) or provide input/output by a user Interface (107) or a sensor (110).

Figure 6:
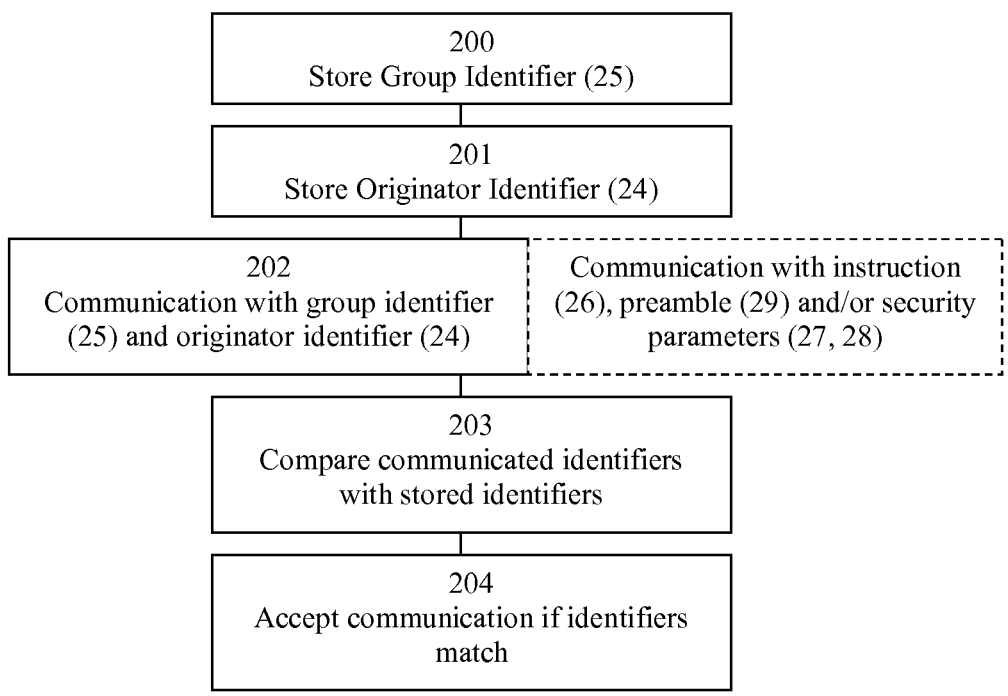
FIG. 6 shows a flow chart example of a group communication method.

FIG. 6 shows an example of a method of group communication. The method includes storing the originator identifier (201) and storing the group identifier (200), communicating (202) including the identifiers and comparing (203) the identifiers to determine if a communication should be accepted (204). The storing of the originator identifier (201) may include communicating the identifier to be stored. The communicating (202) may for example also further include an instruction (26), preamble (29) or security parameters (27-28) etc. The instruction (26) may be executed synchronously. The comparing (203) and accepting (204) of the identifiers may also provide a method of addressing.

It will be understood that the embodiments described herein are merely exemplary and that variations and modifications of the teachings will still fall within the scope of this invention. For example, groups may be zones, sectors, rooms, personal area networks etc. For example communication may be based on the type/category of slave e.g. lock, sensor, shade, lightning etc. For example a master may request status of the slaves after a group communication to verify that the group communication was properly received and performed. For example a group communication may be routed or relayed or broadcasted through other nodes or between nodes. For example multiple channels/frequencies may be used for communication. Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

The invention claimed is:

1. A method of communicating to a group of slaves, the method comprising:
storing in a plurality of slaves at least one group identifier and at least one originator identifier, said plurality of slaves being part of a group of slaves of a building automation system;
wirelessly communicating an instruction, a group identifier and an originator identifier to the slave;
wherein said plurality of slaves accept the communicated instruction, when the group identifier and the originator identifier in the communication match the group identifier and the originator identifier stored in the respective slave,
wherein the communicated instruction is a synchronous instruction the group of slaves execute substantially simultaneously;
wherein at least two masters are assigned each their originator identifier, which originator identifiers are different, and wherein each of said at least two masters are configured for communicating an instruction, a group identifier and it's originator identifier.

2. The method according to claim 1, wherein the slaves have at least an operation mode and an association mode.

3. The method according to claim 2, further comprising: enabling the association mode of the slave; and receiving a communication from a master whereby a master identifier is stored as the originator identifier.

4. The method according to claim 2, further comprising: enabling the association mode of the slaves; communicating to the slaves the at least one group identifier and at least one originator identifier; and storing in the slaves the at least one group identifier and at least one originator identifier.

5. The method according to claim 1, wherein the slaves comprise a unique address.

6. The method according to claim 5, wherein the slaves provide a first communication type, which is a group communication addressed by the group identifier and the originator identifier, and a second communication type, which is an individual communication addressed using the unique address.

7. The method according claim 1, wherein the communication has an embedded security parameter providing communication authenticity.

8. The method according to claim 1, wherein the communication comprises a message authentication code, a communication authentication being based at least on the message authentication code.

9. The method according to claim 1, further comprising communicating to a slave a security setting associated with a security parameter providing communication authenticity.

10. The method according to claim 1, wherein the communication comprises a preamble comprising a sequence of frames, the frames comprising a series identifier indicative of when a data communication is scheduled.

11. The method according to claim 1, wherein the group identifier identifies the group of slaves and the originator identifier identifies a communication transmitter from where the instruction originates.

12. The method according to claim 1, wherein the originator identifier is a unique address of a master issuing the instruction to the group of slaves.

13. The method according to claim 1, further comprising storing in the slave a table with at least one originator identifier and, for each originator identifier in the table, storing an array with the at least one group identifier.

14. The method according to claim 1, wherein the group identifier is a group number or group name or group tag.

15. A controllable wireless communication device, including a wireless communication component, a processor and an input/output unit, the device being configured to receive a wireless group communication,
   wherein the device is configured to store at least one group identifier and at least one originator identifier,
   wherein the device is configured to receive a wireless communication comprising an instruction, a group identifier and an originator identifier and,
   wherein the device is configured to accept the communicated instruction, when the group identifier and originator identifier in the communication match the group identifier and the originator identifier stored in the device,
   wherein the device is configured to be part of a building automation system comprising a plurality of controllable wireless communication devices, which devices are configured for providing a substantially simultaneously execution of a received instruction;
   wherein the building automation system further comprises at least two masters assigned each their originator identifier, which originator identifiers are different,
   wherein each of said at least two masters are configured for communicating an instruction, a group identifier and it's originator identifier; and
   wherein the instruction is a synchronous instruction and devices accepting the communication execute the instruction substantially simultaneously.

16. The device according to claim 15, wherein the device comprises a unique address and is configured to provide a first communication type, which is a group communication addressed by the group identifier and the originator identifier, and a second communication type, which is an individual communication addressed by the unique device address.

17. The device according to claim 15, wherein said device is configured to provide communication authenticity by authenticating the communication based on a security parameter embedded therein.

18. The device according to claim 15, wherein the device has at least a normal operation mode and an association mode, and wherein the device in the association mode is configured to receive a communication from a master whereby a master identifier is stored as the originator identifier.

19. The device according to claim 15, wherein the device has at least a normal operation mode and an association mode, and wherein the device in the association mode is configured to receive a security setting associated with a security parameter providing communication authenticity.

20. The device according to claim 15, wherein the originator identifier is a unique address of a master issuing the instruction to the group of slaves.

21. The device according to claim 15, wherein the slave comprises a table for at least one originator identifier and for each originator identifier in the table storing an array with at least one group identifier.

22. The device according to claim 15, wherein the group identifier is a group number, a group name or a group tag.

23. A wireless communication master device including a wireless communication component, a processor and an input/output unit, the device being configured to transmit a wireless group communication,
   wherein the device is configured to be part of a building automation system comprising a plurality of controllable wireless communication devices,
   wherein the device has a device identifier and is configured to store one or more group identifiers,
   wherein the device is configured to transmit a wireless group communication comprising an instruction, a group identifier of said one or more group identifiers and the device identifier to said plurality of controllable wireless communication devices;
   wherein the building automation system further comprises at least two master devices assigned each their device identifier, which device identifiers are different, and wherein said master devices are configured for transmitting a wireless group; and communication comprising an instruction, a group identifier and it's device identifier;
   wherein the instruction is a synchronous instruction to be executed substantially simultaneously in a group.

24. The master device according to claim 23, wherein the device is configured to setup a group of slaves by transmitting to the group of slaves the device identifier and the group identifier.

25. The master device according to claim 23, wherein the device has at least a normal operation mode and an association mode, and wherein the device in the association mode is configured to setup a group of slaves by transmitting to the group of slaves the device identifier and the group identifier.

26. The master device according to claim 23, wherein the device has at least a normal operation mode and an association mode, and wherein the device in the association mode is configured to transmit a security setting associated with a security parameter providing communication authenticity.

27. The master device according to claim 23, wherein the device is configured to provide a first communication type, which is a group communication to slaves addressed by the group identifier and the originator identifier, and a second communication type, which is an individual communication to slaves addressed by a slave address.

28. The device according claim 23, wherein said device is configured to provide communication authenticity by embedding in the communication a security parameter.

29. The device according to claim 23, wherein the originator identifier is a unique address of a master issuing the instruction to the group of slaves.

30. The device according to claim 23, wherein the group identifier is a group number, a group name or a group tag.

31. A computer program product comprising computer program code stored on a non-transitory computer-readable storage medium which, when executed in an automation device, carries out the method according to claim 1.

32. A method according to claim 1, wherein said wirelessly communicated instruction, group identifier and originator identifier is issued by a master.

33. The method according to claim 1, wherein said at least two masters comprises a plurality of substantially identical group identifiers.

34. The method according to claim 1, wherein said slaves are assigned to a group of slaves comprising similar group identifiers relating to the same originator identifier.

35. A building automation system,
   wherein said building automation system comprises a group of controllable wireless communication devices, wherein said controllable wireless communication devices each includes a wireless communication component, a processor and an input/output unit, wherein said controllable wireless communication devices are configured to receive a wireless group communication, wherein said controllable wireless communication devices are configured to be part of a building automation system, wherein the controllable wireless communication devices are configured to store at least one group identifier and at least one originator identifier, wherein the controllable wireless communication devices are configured to receive a wireless communication from a master device of said building automation system, said wireless communication comprising an instruction, a group identifier and an originator identifier, wherein the controllable wireless communication devices are configured to accept the communicated instruction, when the group identifier and originator identifier in the communication match the group identifier and the originator identifier stored in the device, wherein the wirelessly communicated instruction is a synchronous instruction the group of slaves are arranged to execute substantially simultaneously; and wherein the system further comprises at least two masters assigned each their originator identifier, which originator identifiers are different, and wherein each of said at least two masters are configured for communicating an instruction, a group identifier and it's originator identifier.

* * * * *